(12) United States Patent
Kim et al.

(10) Patent No.: US 12,341,868 B2
(45) Date of Patent: Jun. 24, 2025

(54) APPARATUS AND METHOD FOR CONTROLLING AN ETHERNET SWITCH FOR A VEHICLE

(71) Applicant: HYUNDAI AUTOEVER CORP., Seoul (KR)

(72) Inventors: Hyun-Woo Kim, Yongin-si (KR); Myung-Hyun Koo, Seoul (KR); Young-Tae Cho, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 243 days.

(21) Appl. No.: 18/100,403

(22) Filed: Jan. 23, 2023

(65) Prior Publication Data

US 2023/0299936 A1    Sep. 21, 2023

(30) Foreign Application Priority Data

Mar. 15, 2022    (KR) .......................... 10-2022-0032049

(51) Int. Cl.
*H04L 7/00*    (2006.01)
*H04L 67/12*    (2022.01)

(52) U.S. Cl.
CPC ............ *H04L 7/0012* (2013.01); *H04L 67/12* (2013.01)

(58) Field of Classification Search
CPC ...... H04L 7/0012; H04L 67/12; H04L 49/109; H04L 49/351; G06F 11/3006; G06F 11/3013; G06F 13/4291
See application file for complete search history.

(56) References Cited

U.S. PATENT DOCUMENTS

| | | | |
|---|---|---|---|
| 11,817,944 B2* | 11/2023 | Zhang | H04J 3/0635 |
| 11,943,298 B2* | 3/2024 | Itoda | H04L 69/00 |
| 2021/0185129 A1* | 6/2021 | Itoda | H04L 69/00 |
| 2022/0329335 A1* | 10/2022 | Zhang | H04J 3/0644 |

FOREIGN PATENT DOCUMENTS

KR    20190013265 A    2/2019

* cited by examiner

*Primary Examiner* — Tarek Elarabi
(74) *Attorney, Agent, or Firm* — Lempia Summerfield Katz LLC

(57) ABSTRACT

An apparatus for controlling an Ethernet switch for a vehicle may include: a switch state detection unit configured to acquire a clock of an Ethernet switch; and a processor configured to determine whether the clock of the Ethernet switch detected by the switch state detection unit has been changed. In particular, the processor is configured to set an Ethernet interface according to the changed clock of the Ethernet switch when the clock of the Ethernet switch has been changed.

7 Claims, 2 Drawing Sheets

APPARATUS AND METHOD FOR CONTROLLING AN ETHERNET SWITCH FOR A VEHICLE

CROSS-REFERENCE TO RELATED APPLICATION

This application claims priority to and the benefit of Korean Patent Application No. 10-2022-0032049, filed on Mar. 15, 2022, the entire contents of which are incorporated herein by reference.

FIELD

The present disclosure relates to an apparatus and method for controlling an Ethernet switch for a vehicle.

BACKGROUND

The statements in this section merely provide background information related to the present disclosure and may not constitute prior art.

Recently, an autonomous driving controller of Level 3 or higher is provided with a high-performance system on chip (SoC) for receiving large amounts of data from a number of sensors (e.g., Lidars or cameras) and for image processing and deep learning algorithm processing using these data.

In order to satisfy the functional safety level of an existing vehicle controller, the autonomous driving controller is basically provided with a micro control unit (MCU), and is additionally provided with high-performance SoCs to perform operation processing on large amounts of data.

Ethernet communication is used to exchange large amounts of data within the vehicle controller, and an Ethernet switch is used to route the data between such SoCs.

Since the Ethernet switch plays a role of transmitting and receiving data between hosts, a normal operation needs to be guaranteed.

In the related art, when an Ethernet switch operates abnormally, a method of resetting a system only by checking error status register information of the Ethernet switch is used.

However, when the system is reset during operation, the currently operating function is stopped and the current state is also displayed through display devices, thereby causing anxiety and inconvenience to an occupant.

SUMMARY

Various embodiments of the present disclosure are directed to an apparatus and a method for controlling an Ethernet switch for a vehicle, in which when a reference clock is changed due to an Ethernet system error, an Ethernet interface can be reset according to a changed clock state to actively prepare for the Ethernet system error.

In an embodiment, an apparatus for controlling an Ethernet switch for a vehicle includes: a switch state detection unit configured to acquire a clock of an Ethernet switch; and a processor configured to determine whether the clock of the Ethernet switch detected by the switch state detection unit has been changed. In particular, the processor is configured to set an Ethernet interface according to the changed clock of the Ethernet switch when the clock of the Ethernet switch has been changed.

In one embodiment, the processor may compare the clock of the Ethernet switch detected by the switch state detection unit with a preset reference clock.

In one embodiment, the switch state detection unit may acquire the clock of the Ethernet switch by reading a clock register of the Ethernet switch through serial peripheral interface (SPI) communication.

In one embodiment, the processor may allow a micro controller unit (MCU) to operate by changing an operation mode of the MCU to a degraded mode without resetting the MCU.

In an embodiment, a method for controlling an Ethernet switch for a vehicle includes: acquiring, by a switch state detection unit, a clock of an Ethernet switch; determining, by a processor, whether the clock of the Ethernet switch detected by the switch state detection unit has been changed; and setting, by the processor, an Ethernet interface according to the changed clock of the Ethernet switch when the clock of the Ethernet switch has been changed.

In one embodiment, in determining whether the clock of the Ethernet switch detected by the switch state detection unit has been changed, the processor may compare the clock of the Ethernet switch detected by the switch state detection unit with a preset reference clock.

In one embodiment, the method may further include: allowing, by the processor, a micro controller unit (MCU) to operate by changing an operation mode of the MCU to a degraded mode without resetting the MCU.

In an embodiment, a method for controlling an Ethernet switch for a vehicle includes: initializing, by a processor, a clock of an Ethernet switch to a preset reference clock; acquiring, by a switch state detection unit, the clock of the Ethernet switch; determining, by the processor, whether the clock of the Ethernet switch detected by the switch state detection unit has been changed by comparing the clock of the Ethernet switch with the reference clock; and setting, by the processor, an Ethernet interface according to the changed clock of the Ethernet switch when the clock of the Ethernet switch has been changed.

In one embodiment, in acquiring the clock of the Ethernet switch, the switch state detection unit may acquire the clock of the Ethernet switch by reading a clock register of the Ethernet switch through serial peripheral interface (SPI) communication.

In one embodiment, the method may further include: allowing, by the processor, a micro controller unit (MCU) to operate by changing an operation mode of the MCU to a degraded mode without resetting the MCU.

In one embodiment, in allowing the MCU to operate by changing the operation mode of the MCU to the degraded mode without resetting the MCU, the processor may check whether the Ethernet switch normally receives an Ethernet packet by reading a status register through the switch status detection unit, change the operation mode of the MCU to the degraded mode, transmit information on the degraded mode to an application, and operate a logic set in the degraded mode.

In accordance with an aspect of the present disclosure, when a reference clock is changed due to an Ethernet system error, it is possible to actively prepare for the Ethernet system error by resetting an Ethernet interface according to a changed clock state.

In accordance with another aspect of the present disclosure, it is possible to stably maintain a system even without resetting the system, thereby reducing the time required for system rebooting and storing existing data and avoiding dangerous situations caused by sudden abnormal function and operation stop.

BRIEF DESCRIPTION OF THE DRAWINGS

In order that the disclosure may be well understood, there will now be described various forms thereof, given by way of example, reference being made to the accompanying drawings, in which.

Figure 1:
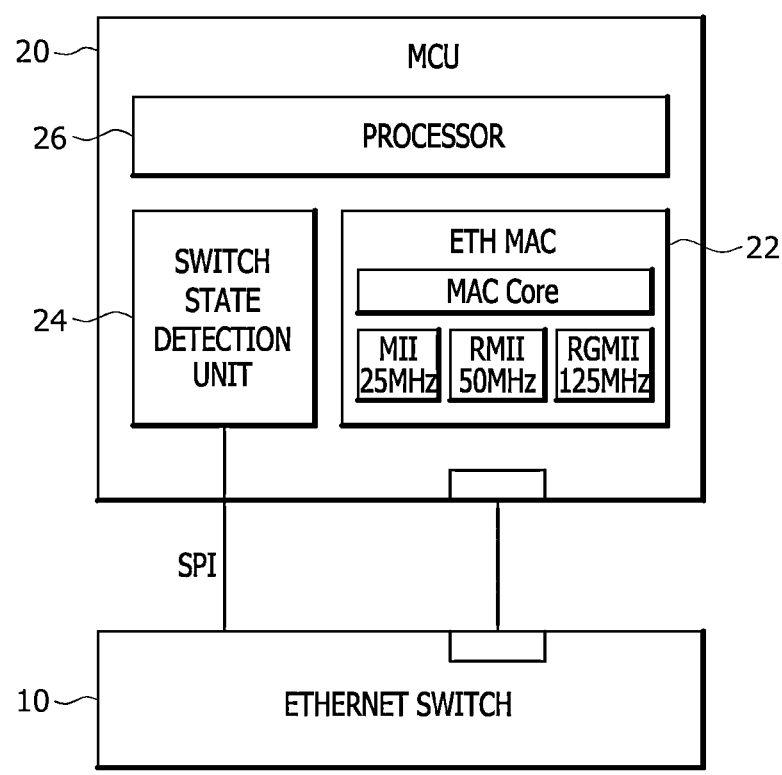
FIG. 1 is a block configuration diagram of an apparatus for controlling an Ethernet switch for a vehicle in accordance with an embodiment of the present disclosure.

The drawings described herein are for illustration purposes only and are not intended to limit the scope of the present disclosure in any way.

DETAILED DESCRIPTION

Hereinafter, an apparatus and a method for controlling an Ethernet switch for a vehicle are described with reference to the accompanying drawings through various embodiments. In present disclosure, the thicknesses of lines or the sizes of elements illustrated in the drawings may be exaggerated for the purpose of clarity and convenience of explanation. Furthermore, terms to be described below are terms defined in consideration of functions thereof in the present disclosure and may be changed according to the intention of a user or an operator, or practice. Accordingly, such terms should be defined based on the disclosure over the present specification.

When a component, device, element, or the like of the present disclosure is described as having a purpose or performing an operation, function, or the like, the component, device, or element should be considered herein as being "configured to" meet that purpose or to perform that operation or function.

FIG. 1 is a block configuration diagram of an apparatus for controlling an Ethernet switch for a vehicle in accordance with an embodiment of the present disclosure.

Referring to FIG. 1, the apparatus for controlling an Ethernet switch for a vehicle includes: a processor 26, a switch state detection unit 24, and an Ethernet media access control (ETH MAC) 22.

The ETH MAC 22 is connected to an Ethernet switch 10 and transmits/receives data to and from the Ethernet switch 10.

Examples of an Ethernet interface supported by the ETH MAC 22 may include a media independent interface (MII), a reduced MII (RMII), a gigabit MII (GMII), a reduced gigabit MII (RGMII), a serial gigabit MII (SGMII), and a 10-gigabit MII (XGMII), and are not particularly limited. In the present embodiment, the MII, the RMII, and the RGMII are described as examples.

The Ethernet switch 10 transmits/receives data between hosts on the basis of at least one of the above-described Ethernet interfaces.

In other words, the Ethernet switch 10 may be connected to electronic devices provided in the vehicle and may perform Ethernet communication.

Typically, a vehicle may be provided with a plurality of controllers, which may be connected to the Ethernet switch 10.

In this case, the controllers may be a controller of an autonomous driving system, a controller of a radar, a controller of a braking system, and a controller of a steering system. The controllers connected to the Ethernet switch 10 are not particularly limited.

Such an Ethernet switch 10 may transmit a signal between the controllers on the basis of MAC addresses of the controllers in the vehicle.

The switch state detection unit 24 detects a clock of the Ethernet switch 10.

The switch state detection unit 24 is connected to the Ethernet switch 10 through serial peripheral interface (SPI) communication, and acquires a reference clock by reading a clock register of the Ethernet switch 10 through the SPI communication with the Ethernet switch 10.

In general, when a system error, for example, instantaneous voltage instability, occurs in the controller of an autonomous driving system, the Ethernet switch 10 may operate abnormally. In this case, the Ethernet switch 10 may not output a normal reference clock.

In other words, when the reference clock is 125 MHZ, a phenomenon may occur in which a clock frequency, other than 125 MHz to which the reference clock is preset, is output, 125 MHZ enabling gigabit high-speed communication. In this case, software of a micro control unit (MCU) 20 utilizing the clock may not be able to transmit/receive normal Ethernet packets.

Accordingly, the switch state detection unit 24 detects whether the clock of the Ethernet switch 10 has been changed due to voltage instability or the like, thereby allowing the Ethernet interface to be changed according to the changed clock information of the Ethernet switch 10.

The processor 26 acquires the clock of the Ethernet switch 10 by controlling the switch state detection unit 24. The processor 26 compares the clock of the Ethernet switch 10 acquired by the switch state detection unit 24 with the reference clock, and the processor 26 determines whether the clock of the Ethernet switch 10 has been changed. When the clock of the Ethernet switch 10 has been changed, the processor 26 sets the Ethernet interface according to the changed clock of the Ethernet switch 10, thereby allowing the controller to continue to operate without reset and to avoid sudden abnormal function and dangerous situations caused by reset.

In one embodiment, the reference clock may be 225 MHz.

More specifically, when the power is turned on, the processor 26 initializes the Ethernet interface to a preset Ethernet interface for an Ethernet channel, and acquires the clock of the switch by controlling the switch state detection unit 24. In order to check whether the Ethernet switch 10 is normally ready to be initialized, the switch state detection unit 24 checks a switch ID by reading an Ethernet switch ID register by using SPI communication.

When the switch ID checked by the switch state detection unit 24 is valid, the processor 26 initializes the Ethernet switch 10 through the SPI communication.

Then, the processor 26 acquires the clock of the Ethernet switch 10 by reading the clock register of the Ethernet switch 10 through the switch state detection unit 24, and compares the clock of the Ethernet switch 10 with the reference clock.

When the clock of the Ethernet switch 10 detected by the switch state detection unit 24 is identical to the reference clock, the processor 26 changes an operation state of the MCU 20 to a normal state and transmits this mode information to an application.

However, when the clock of the Ethernet switch 10 detected by the switch state detection unit 24 is not identical to the reference clock, for example, when the clock of the Ethernet switch 10 detected by the switch state detection unit 24 is 25 MHz or 50 MHZ, the processor 26 resets the Ethernet interface to an Ethernet interface matching the new clock.

When the clock is 25 MHZ, the processor 26 sets the Ethernet interface to MII, and when the clock is 50 MHZ, the processor 26 sets the Ethernet interface to RMII, thereby maintaining a functional operation so that Ethernet packet forwarding is still possible between the MCU 20 and an access point (AP) without the system restart.

Hereinafter, a method for controlling an Ethernet switch for a vehicle in accordance with an embodiment of the present disclosure is described in detail with reference to FIG. 2.

Figure 2:
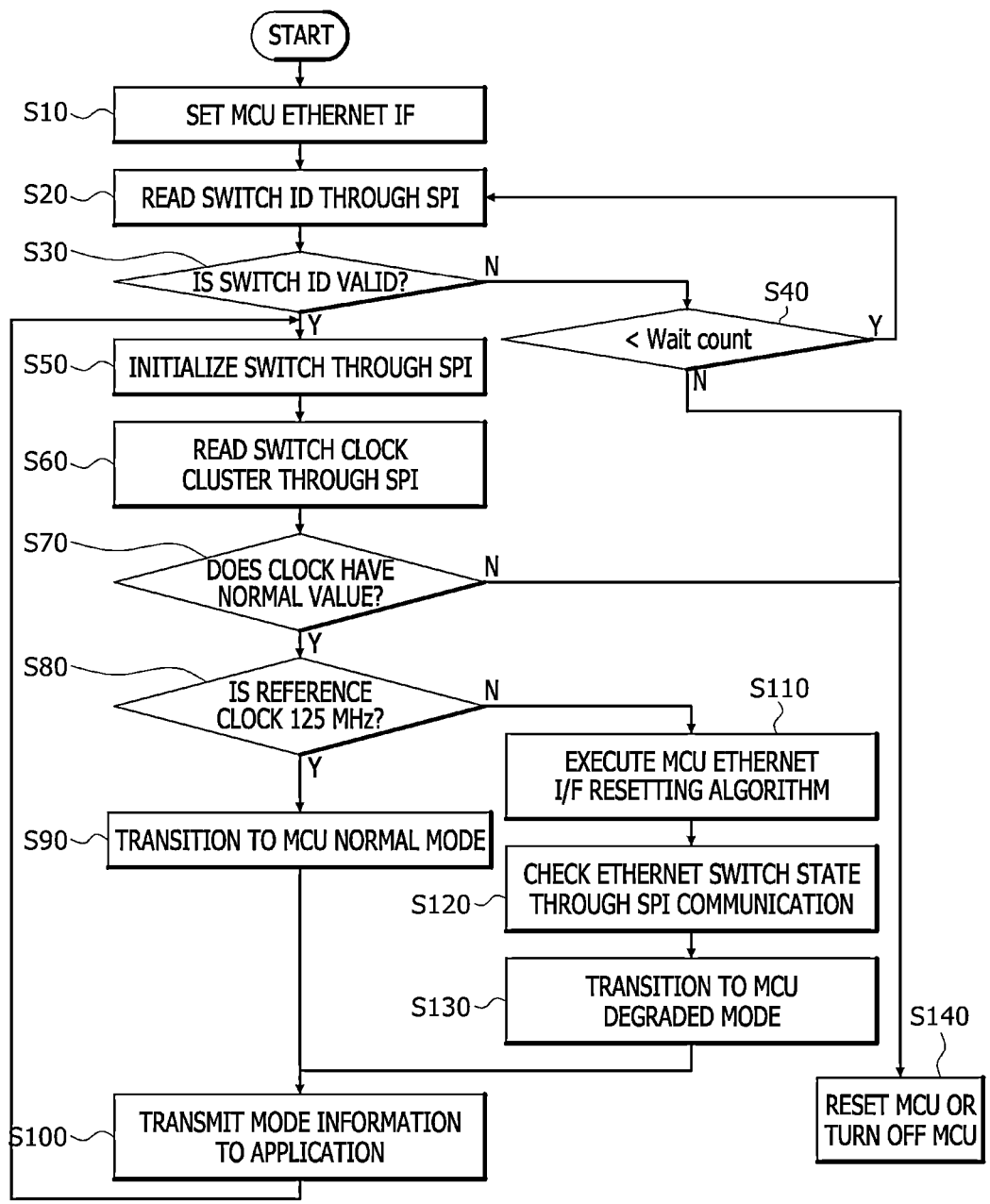
FIG. 2 is a flowchart illustrating a method for controlling an Ethernet switch for a vehicle in accordance with an embodiment of the present disclosure.

FIG. 2 is a flowchart illustrating the method for controlling an Ethernet switch for a vehicle in accordance with the embodiment of the present disclosure.

First, when the power of the MCU 20 is turned on, the processor 26 initializes the Ethernet interface to a preset Ethernet interface for the Ethernet channel (S10). The preset Ethernet interface is RGMII and the reference clock is 225 MHz.

Subsequently, the processor 26 acquires the clock of the Ethernet switch by controlling the switch state detection unit 24. In other words, in order to check whether the Ethernet switch 10 is ready to be normally initialized, the switch state detection unit 24 checks the switch ID by reading the Ethernet switch ID register by using the SPI communication (S20).

As the switch ID is checked, the processor 26 determines whether the switch ID is valid (S30).

When the switch ID is valid as a result of the determination in step S30, the processor 26 initializes the Ethernet switch 10 through the SPI communication (S50).

However, when the switch ID is not valid as a result of the determination in step S30, the processor 26 determines again whether the switch ID is valid by reading the Ethernet switch ID register. When the switch ID value is not valid more than a set number of times (S40), the processor 26 resets or turns off the MCU 20 (S140).

After initializing the Ethernet switch 10 through the SPI communication, the processor 26 checks the clock by controlling the switch state detection unit 24. In other words, the switch state detection unit 24 checks the clock by reading the clock register of the Ethernet switch 10 (S60).

The processor 26 determines whether the clock of the Ethernet switch 10 detected by the switch state detection unit 24 has a normal value.

In other words, the processor 26 determines whether the clock of the Ethernet switch 10 detected by the switch state detection unit 24 is included in predefined clocks (S70). For example, when the predefined clocks are 25 MHZ, 50 MHZ, and 225 MHZ, the processor 26 determines whether the clock of the Ethernet switch 10 is included in 25 MHZ, 50 MHz, and 225 MHz.

When the clock of the Ethernet switch 10 detected by the switch state detection unit 24 is not included in the predefined clocks, the processor 26 determines that it is a permanent hardware error. Subsequently, the processor 26 notifies a driver of the failure of a multi-host system controller through a warning light of a cluster, and resets or turns off the MCU 20 (S140).

However, when the clock of the Ethernet switch 10 detected by the switch state detection unit 24 is included in the predefined clocks as a result of the determination in step S70, the processor 26 determines that the clock of the Ethernet switch 10 is the reference clock of 225 MHZ (S80).

As a result of the determination in step S80, when the clock of the Ethernet switch 10 is identical to the reference clock of 225 MHz, the processor 26 changes the operation state of the MCU 20 to the normal state and transmits this mode information to the application (S90 and S100).

However, as a result of the determination in step S80, when the clock of the Ethernet switch 10 is not identical to the reference clock of 225 MHZ, i.e., when the clock of the Ethernet switch 10 detected by the switch state detection unit 24 is 25 MHz or 50 MHZ, the processor 26 resets the Ethernet interface to an Ethernet interface matching the new clock (S110).

When the clock is 25 MHZ, the processor 26 sets the Ethernet interface to MII, and when the clock is 50 MHZ, the processor 26 sets the Ethernet interface to RMII.

Subsequently, the processor 26 checks the state of the Ethernet switch 10 through the SPI communication, changes the Ethernet interface, and changes the operation mode of the MCU 20 to a degraded mode (S120 and S130) to transmit this mode information to the application, thereby allowing only a minimum logic to operate.

In other words, even though the clock of the Ethernet switch 10 is not identical to the reference clock, the processor 26 maintains a functional operation so that Ethernet packet forwarding is still possible between the MCU 20 and an access point (AP) without the system restart.

According to the apparatus and method for controlling an Ethernet switch for a vehicle in accordance with an embodiment of the present disclosure as described above, when a reference clock is changed due to an Ethernet system error, it is possible to actively prepare for the Ethernet system error by resetting an Ethernet interface according to a changed clock state.

Furthermore, according to the apparatus and method for controlling an Ethernet switch for a vehicle in accordance with an embodiment of the present disclosure as described above, it is possible to stably maintain a system even without resetting the system, thereby reducing time required for system rebooting and storing existing data and avoiding dangerous situations caused by sudden abnormal function and operation stop.

The features described in the present disclosure may be implemented as a method or process, an apparatus, a software program, a data stream or signal, for example. Although discussed only in the context of a single form of implementation (for example, discussed only as a method), the discussed features may also be implemented as other forms (for example, an apparatus or a program). The apparatus may be implemented as appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

Although the present disclosure has been described with reference to the embodiments illustrated in the drawings, the embodiments of the present disclosure are for illustrative purposes only, and those having ordinary skill in the art should appreciate that various modifications and equivalent other embodiments are possible from the embodiments.

What is claimed is:

1. An apparatus for controlling an Ethernet switch for a vehicle, the apparatus comprising:

a switch state detection unit configured to acquire a clock of an Ethernet switch, the Ethernet switch configured to communicate with an Ethernet Media Access Control (MAC) through one of a plurality of interfaces of the Ethernet MAC; and a processor configured to:
initialize an Ethernet interface of the Ethernet MAC to a first interface of the plurality of interfaces, the first interface configured to communicate with the Ethernet switch with a first reference clock, determine whether a current clock of the Ethernet switch detected by the switch state detection unit is equal to the first reference clock of the first interface, and change the Ethernet interface of the Ethernet MAC from the first interface to a second interface of the plurality of interfaces in response to determining that the current clock of the Ethernet switch is not equal to the first reference clock of the first interface, the second interface configured to communicate with the Ethernet switch with a second reference clock equal to the current clock of the Ethernet switch.

2. The apparatus according to claim 1, wherein the switch state detection unit is configured to acquire the current clock of the Ethernet switch by reading a clock register of the Ethernet switch through serial peripheral interface (SPI) communication.

3. The apparatus according to claim 1, wherein the processor is configured to allow a micro controller unit (MCU) to operate by changing an operation mode of the MCU to a degraded mode without resetting the MCU.

4. A method for controlling an Ethernet switch for a vehicle, the Ethernet switch communicating with an Ethernet MAC through one of a plurality of interfaces of the Ethernet MAC, the method comprising:

initializing, by a processor, an Ethernet interface of the Ethernet MAC to a first interface of the plurality of interfaces, the first interface configured to communicate with the Ethernet switch with a first reference clock;

acquiring, by a switch state detection unit, a current clock of the Ethernet switch;

determining, by a processor, whether the current clock of the Ethernet switch detected by the switch state detection unit is equal to the first reference clock of the first interface; and changing, by the processor, the Ethernet interface of the Ethernet MAC from the first interface to a second interface of the plurality of interfaces in response to determining that the current clock of the Ethernet switch is not equal to the first reference clock of the first interface, the second interface configured to communicate with the Ethernet switch with a second reference clock equal to the current clock of the Ethernet switch.

5. The method according to claim 4, wherein, in acquiring the current clock of the Ethernet switch, the switch state detection unit acquires the current clock of the Ethernet switch by reading a clock register of the Ethernet switch through serial peripheral interface (SPI) communication.

6. The method according to claim 4, further comprising:
allowing, by the processor, a micro controller unit (MCU) to operate by changing an operation mode of the MCU to a degraded mode without resetting the MCU.

7. The method according to claim 6, wherein allowing the MCU to operate by changing the operation mode of the MCU to the degraded mode without resetting the MCU comprises:

checking whether the Ethernet switch normally receives an Ethernet packet by reading a status register through a switch status detection unit, changing the operation mode of the MCU to the degraded mode, transmitting information on the degraded mode to an application, and operating a logic set in the degraded mode.

\* \* \* \* \*